Figure 1:
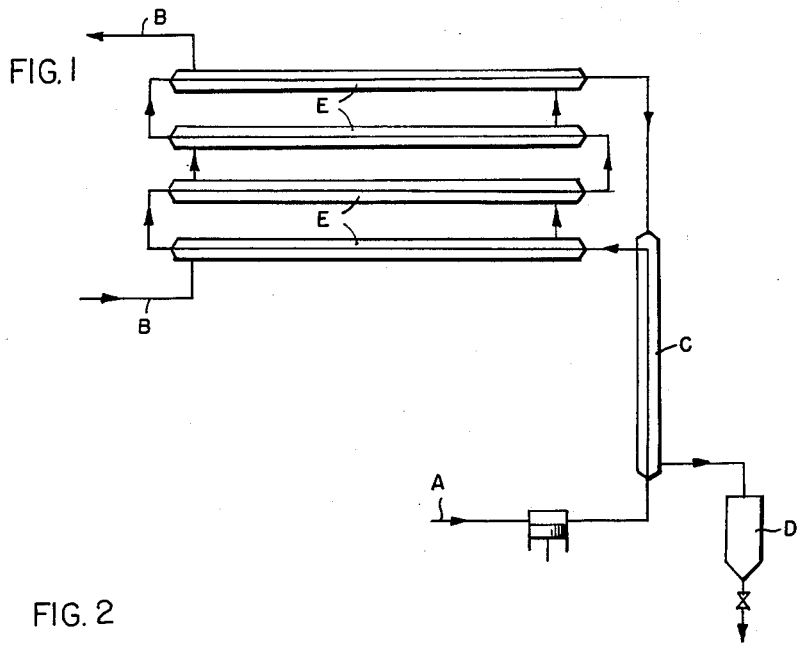

July 6, 1965   HANS-JOACHIM NEBEL ETAL   3,193,575
PRODUCTION OF CONDENSATION PRODUCTS OF NAPHTHALENESULFONIC
ACIDS AND ALDEHYDES
Filed March 9, 1962

INVENTORS:
HANS-JOACHIM NEBEL
HANS STANGER
OTTO HERTEL
ALBERT PALM

BY Margare Johnston Cook & Root
ATT'YS 3,193,575
PRODUCTION OF CONDENSATION PRODUCTS OF NAPHTHALENESULFONIC ACIDS AND ALDEHYDES
Hans-Joachim Nebel, Hans Stanger, Otto Hertel, and Albert Palm, all of Ludwigshafen (Rhine), Germany, assignors to Badische Anilin- & Soda-Fabrik Aktiengesellschaft, Ludwigshafen (Rhine), Germany
Filed Mar. 9, 1962, Ser. No. 178,600
Claims priority, application Germany, Mar. 10, 1961, B 61,609, B 61,610
3 Claims. (Cl. 260—505)

The present invention relates to an improved process for the production of condensation products of naphthalenesulfonic acids and aldehydes in acid medium.

It has heretofore already been known that the condensation products obtained by reacting naphthalenesulfonic acids and their homologues with formaldehyde or agents giving off formaldehyde in acid medium have a high solvent power for those components in natural tannins which are difficultly soluble. The temperature at which said condensation was preferably carried out between 60° and 100° C. The compounds thus formed have two moles of naphthalene sulfonic acid combined with 1 mole of formaldehyde. For example the compound of naphthalene-2-sulfonic acid and formaldehyde probably has the formula:

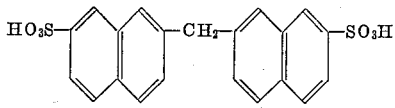

This known method has a number of shortcomings. The condensation proceeds very slowly so that reaction periods of about twenty-four hours must be incurred to carry the reaction to completion. Furthermore, even when the amount of formaldehyde used for the reaction is in excess of the above mentioned mole ratio, it is not possible, by the conventional method, to bring about a quantitative formation of the desired condensation products. By reacting 0.55 mole of formaldehyde or more with one mole of naphthalenesulfonic acid, only a mixture of the desired condensation product with unchanged naphthalenesulfonic acid, which is useless for dissolving tannins, is obtained. When an attempt is made to transfer this method to other aldehydes, only little or no naphthalenesulfonic acid condensate is obtained in addition to large amounts of undesired byproducts by the aldehydes reacting too rapidly with themselves. The known method cannot be carried out continuously because of the long reaction periods.

It is an object of this invention to shorten the time required for the reaction of naphthalenesulfonic acids with formaldehyde or agents giving off formaldehyde and to provide higher yields of the desired reaction products.

Another object of the invention is the combination of larger amounts of formaldehyde than was hitherto possible with naphthalenesulfonic acids.

It is also an object of this invention to use aldehydes other than formaldehyde for the reaction with naphthalenesulfonic acids.

A further object of the invention is to produce substances which are better solvents for natural tannins than are the conventional condensation products from naphthalenesulfonic acid and formaldehyde.

A still further object of this invention is to provide a process by which the condensation of naphthalenesulfonic acids with formaldehyde and other aldehydes can be carried out continuously.

We have found that the said objects can be achieved and that condensation products from naphthalenesulfonic acids and aldehydes or substances giving off aldehydes in aqueous acid medium can be produced in a substantially improved way, by carrying out the condensation at a temperature above 100° C. and at increased hydrostatic pressure.

The term "hydrostatic pressure" is familiar in the art and means the pressure exerted by liquids at rest. In the present instance it means that the acid aqueous solution in which the condensation reaction is to proceed must be subjected to a pressure acting on all sides. Hydrostatic pressure must therefore not be confused with mechanical pressure acting merely on one side, such as is exerted for example by calender rollers or presses. By "increased hydrostatic pressure" within the purport of the present invention we mean a hydrostatic pressure which is equal to or greater than the vapor pressure of the acid aqueous reaction mixture which occurs at the reaction temperature. The hydrostatic pressure to be used thus has its lower limit defined by the vapor pressure of the reaction mixture at the reaction temperature. It is about 1.3 atmospheres at 100° C. and about 2.9 atmospheres at 120° C. The upper limit of the hydrostatic pressure is determined by the pressure which the apparatus used can withstand. It is therefore possible, when high pressure apparatus are used, to apply a very considerable hydrostatic pressure, for example 200 atmospheres. For reasons of economy, however, a hydrostatic pressure slightly above the vapor pressure has special importance. The preferred hydrostatic pressure is therefore between 3 and 12 atmospheres.

The hydrostatic pressure required for the new process can be produced in various conventional ways. The simplest technique consists in heating the aqueous solution of the substances to be condensed to the desired temperature in a closed, pressure-tight vessel, for example in a pressure boiler. In this manner, without further measures being required, a hydrostatic pressure is set up which corresponds to the vapor pressure of the reaction solution. It is also possible, however, to pump a gas which does not react with the contents of the vessel, for example nitrogen, or a liquid, for example formaldehyde solution or a solution of naphthalenesulfonic acid, these two solutions either separately or combined, into the vessel in which the reaction solution has been charged. It is then possible by using the pump or by using a valve provided on the reaction vessel to make the hydrostatic pressure equal to the vapor pressure of the reaction solution or to apply a higher pressure. If the reactor is constructed as a tubular system connected at one end to a pressure pump and closed at the other end by an exhaust valve, it is possible to prepare the desired condensation products continuously.

Suitable naphthalenesulfonic acids are naphthalenemonosulfonic acids, i.e. naphthalene-1-sulfonic acid and naphthalene-2- sulfonic acid, and naphthalenedisulfonic acids, for example naphthalene-1,6-disulfonic acid, naphthalene-2,6-disulfonic acid and naphthalene-2,7-disulfonic acid, i.e. naphthalenesulfonic acids with up to two sulfonic acid groups in the molecule. Naphthalene-2-sulfonic acid is of special technical interest. The homologues of these acids, for example methylnaphthalenesulfonic acids, may also be used.

Aldehydes which may be reacted according to the new process are monoaldehydes or polyaldehydes, preferably those having up to six carbon atoms, for example acetaldehyde, propionaldehyde, butyraldehyde, glyoxal and furfurol. Among these aliphatic aldehydes with one to four carbon atoms are of special technical interest. For reasons of economy we prefer using monoaldehydes. The aldehydes may be used by themselves or in the form of substances which yield such aldehydes under the reaction conditions, for example paraldehyde. In both cases reaction takes betwen naphthalenesulfonic acid and free aldehyde. Condensation products which are especially valuable technically are obtained by using formaldehyde. It may be used by itself, preferably in aqueous solution, or in the form of formaldehyde donors, such as paraformaldehyde, hexamethylene tetramine or trihydroxymethylene.

In the practice of our invention the initial materials are reacted with each other in the presence of acids. The pH value of the reaction mixture may be between 0.2 and 2. It is preferred to use strong mineral acids for adjusting the pH value. For practical reasons sulfuric acid is preferred and this is mixed, as a rule, with the naphthalenesulfonic acids available from the manufacturing process. The temeprature for the reaction is above 100° C. Good results are achieved when the condensation is carried out at a temperature between 100° and 200° C. The temperature range between 120° and 170° C. is of special importance technically. The preferred temperature is 120° to 140° C. when formaldehyde is used as a reaction component. Aldehydes having more than one, specifically from two to four, carbon atoms are reacted with naphthalenesulfonic acids preferably at 130° to 170° C.

The relative proportions of the initial materials may be chosen within wide limits for the new process. Thus 0.2 to 2 moles of an aldehyde, or the equivalent amount of an aldehyde donor, may be used for one mole of a naphthalenesulfonic acid. Products preferred on account of their valuable technical properties are obtained by condensing one mole of a naphthalene sulfonic acid with 0.55 to 1.1 moles of an aldehyde, especially formaldehyde. Products with an especially high solvency for tannins are formed from 0.6 to 0.9 mole of an aldehyde to one mole of a naphthalenesulfonic acid.

The concentration in the reaction mixture of the components to be reacted is of no great importance for the practicability of our process. It is therefore possible to condense the initial components in the presence of small or large amounts of a diluent, preferably water. The amount of the diluent has an influence on the viscosity of the mixture.

In the usual case, condensation is completed in thirty minutes to one hour when formaldehyde is used. Reaction with other aldehydes generally proceeds more slowly; about one to eight hours are necessary for complete condensation depending on the nature of the aldehyde. The time required for the reaction may easily be determined by a preliminary experiment through ascertaining the aldehyde consumption. When the process is conducted continuously, the withdrawal of the end product and the introduction of the initial materials are so controlled that not only is the desired hydrostatic pressure maintained as above explained, but that the reaction mixture remains for about thirty minutes to eight hours in the reaction zone of the production apparatus, i.e. in that part of the apparatus in which the mixture is brought to the temperature necessary for the condensation by means of a heating device. It is good practice to withdraw the end product not immediately at the end of the reaction zone but to allow it to first flow through a cooling zone in which it is cooled, advantageously be heat exchanged. During continuous operation, care should be had that the apparatus be constantly kept filled completely with the reaction mixture so that no gaseous phase is formed.

If, the reaction having been completed the mixture still contains major amounts of sulfuric acid from the sulfonation of naphthalene or its homologues, it is advantageous to remove this in conventional manner by adding lime and filtering off the calcium sulfate formed.

Compared to the conventional processes, the process in accordance with our invention has a number of advantages which could not be foreseen. It permits the reaction of naphthalenesulfonic acids with aldehydes in a surprisingly short time. It is only by this that continuous operation of the condensation process is rendered possible at all. Moreover it can be carried out not only with formaldehyde but also with other aldehydes without troublesome amounts of byproducts being formed by the reaction of the aldehydes with themselves. Whereas the end product of the conventional processes, as explained above, always contain unreacted naphthalenesulfonic acid, it is possible by the new process, when using 0.5 mole or more of aldehyde to one mole of naphthalenesulfonic acid, to obtain end products in which the whole of the naphthalenesulfonic acid has undergone chemical reaction. The end products are therefore either pure compounds of the general formula

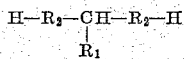

or mixtures of these compounds with substances of the general formula

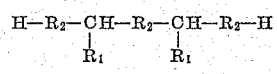

In these formulae $R_1$—CH= denotes the radical of an aldehyde of the type defined above and —$R_2$— denotes the divalent radical of a monosulfonic or disulfonic acid of naphthalene or an alkyl naphthalene, preferably a methylnaphthalene. It has not yet been fully elucidated in what manner the components are combined in the new process. The condensation products from naphthalene-2-sulfonic acid and formaldehyde probably correspond to the following formulae:

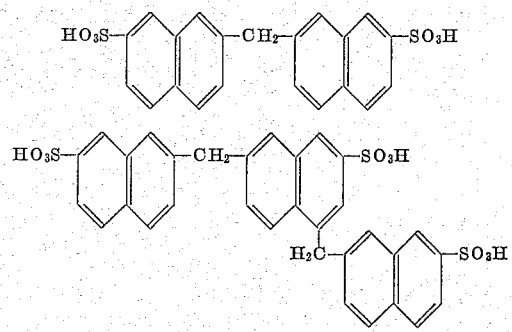

and

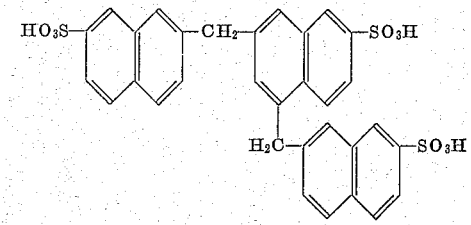

Other condensation products obtainable according to the new process presumably have a similar constitution. The outstanding feature of the new process is the possibility to react more than 0.55 mole of formaldehyde with 1 mole of naphthalenesulfonic acid without insoluble, and therefore useless, products being obtained by "overcondensation."

The condensation products obtainable by the new process are high-quality auxiliaries for use in tanning; they have the capacity of dissolving the sparingly soluble components of natural tannins; moreover they have themselves tanning power. The condensation products which contain more than 0.55 mole of formaldehyde to 1 mole of naphthalenesulfonic acid are notably superior to prior art condensates which contain less formaldehyde, by reason of their considerably higher percentage in tans referred to the water soluble solids, i.e. the sum of tans and nontans. For the sake of brevity this percentage of tans will hereinafter be referred to as "tan/solids ratio."

Substances obtainable according to this invention are also excellent dispersing agents, for example for dyes and for paper making.

The products obtained by the process according to our invention may be used as aqueous solutions of the free sulfonic acids such as are obtained in the course of production, if necessary deacidified with lime; the solutions of the free sulfonic acids may also be neutralized, however, with alkali metal hydroxides, alkaline earth metal hydroxides, ammonia or amines prior to use. Preferably, however, the solutions are dried desirably after neutralization, by conventional methods, such as drum or spray drying, to form powders which can easily be dissolved again in water. In any of these forms the products are temperature-resistant and may be shelved indefinitely.

The invention is illustrated by, but not limited to, the following examples. Parts and percentages are by weight.

Example 1

1000 parts of naphthalene is sulfonated within five hours at 160° C. with 1000 parts of 98% sulfuric acid. The sulfonic acid obtained (mainly naphthalene-2-sulfonic acid) is diluted with 500 parts of water and then combined with 530 parts of 30% aqueous formaldehyde solution. The resultant solution is pumped at a rate of 1.5 liters per hour at a pressure of 4 atmospheres through a tube 8 m. in length and 1.6 cm. in diameter which is heated externally to 120° C. The reaction mixture remains in the heated tube for about one hour. The reacted mixture then passes through a heat exchanger and, after having been cooled, is withdrawn at the end of the system with decompression. The mixture contains naphthalene-2-sulfonic acid and formaldehyde condensed in the molar ratio 1:0.68. The apparatus used in the practice of this example is illustrated diagrammatically in FIGURE 1 of the accompanying drawing. In this drawing A denotes the feed line, B the heating connections, C the heat exchanger, D the discharging device and E the heated tube. After the mixture has been diluted with 1000 parts of water it is neutralized with 1000 parts of 50% caustic soda solution to pH 7.2 to 8.0 and dried to form 2200 parts of powder in a double-drum drier.

Analysis of the tannin gives the following values:

Tans _____ percent__ 52.0
Nontans _____ do____ 42.5
Tan/solids ratio _____ 55.0

Example 2

1000 parts of naphthalene is heated with 1000 parts of 98% sulfuric acid for five hours at 160° C., the product is diluted with 500 parts of water and 690 parts of 30% aqueous formaldehyde solution is added. The molar ratio of naphthalene-2-sulfonic acid to formaldehyde is 1:0.89. The solution is further processed as in Example 1.

Analysis of the pale brown powder obtained gives the following values:

Tans _____ percent__ 66.1
Nontans _____ do____ 30.2
Tan/solids ratio _____ 68.6

Example 3

Figure 2:
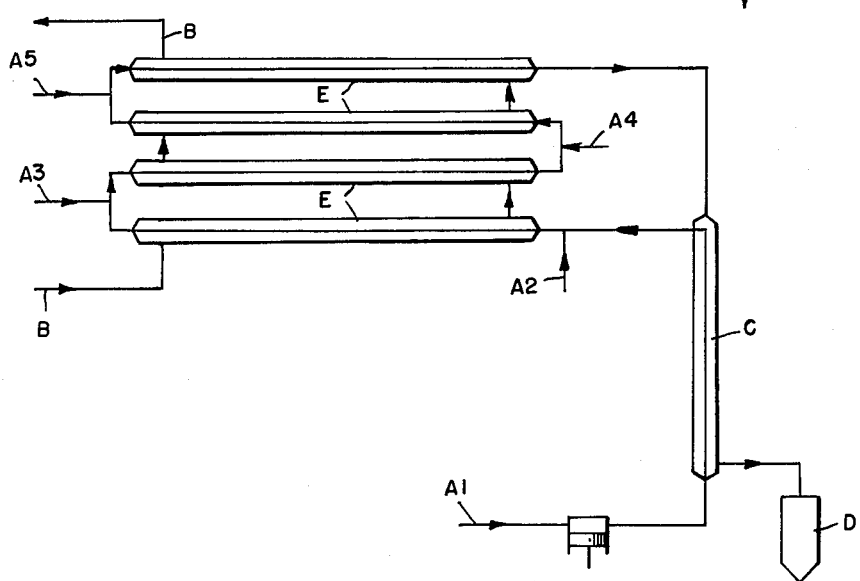

Using an apparatus as illustrated diagrammatically in FIGURE 2 of the accompanying drawing a solution of 400 parts of the naphthalenesulfonic acid obtained as described in Example 1 in 200 parts of water is pumped at a rate of 0.6 liter per hour (equal to 1.8 moles of naphthalene-2-sulfonic acid per hour) through feed line $A_1$ and through tube E (8 m. in length and 1.6 cm. in diameter) which is heated externally to 150° C. through a heating connection B. The residence time of the reaction mixture in tube E is about 2.5 hours. 80 ml./hour (0.9 mole/hour) of isobutyraldehyde is metered into the apparatus in four equal portions from $A_2$, $A_3$, $A_4$ and $A_5$. The discharge valve D is adjusted so that a pressure of 10 atmospheres is set up and maintained in the system by the feed pump. The reacted material, in which naphthalene-2-sulfonic acid and isobutyraldehyde are combined with each other in the ratio of 1:0.5, is cooled in a heat exchanger C and decompressed and discharged through discharge valve D. The solution obtained is neutralized to pH 7.2 to 8.0 with 50% caustic soda solution, filtered and dried to a powder in a spray drier.

Analysis of the tannin gives the following values:

Tans _____ percent__ 37.5
Nontans _____ do____ 59.0
Tan/solids ratio _____ 38.9

Example 4

1000 parts of naphthalene is sulfonated with 1000 parts of 98% sulfuric acid for five hours at 160° C. After diluting the naphthalene-2-sulfonic acid obtained with 500 parts of water, 530 parts of 30% aqueous formaldehyde solution is added and the mixture is heated in a lead-lined pressure vessel for thirty minutes at 120° C. The pressure in the vessel is about 3 atmospheres. The reaction mixture, which contains naphthalenesulfonic acid and formaldehyde combined in the molar ratio 1:0.68, is allowed to cool, diluted with 1000 parts of water, neutralized with 1000 parts of 50% caustic soda solution to pH 7.2 to 8.0 and the solution is dried in a double-drum drier 2200 parts of a powder being obtained.

Analysis of the tannin gives the following values:

Tans _____ percent__ 51.9
Nontans _____ do____ 43.0
Tan/solids ratio _____ 54.6

Example 5

1000 parts of naphthalene is heated with 1000 parts of 98% sulfuric acid for five hours at 160° C. After diluting the solution with 500 parts of water 690 parts of 30% aqueous formaldehyde solution is added and the mixture is heated for an hour at 120° C. in a lead-lined pressure vessel. Nitrogen is forced in to maintain the pressure at 4.5 atmospheres. The reaction mixture obtained, which contains naphthalene-2-sulfonic acid and formaldehyde combined in the molar ratio 1:0.89, is diluted with 1000 parts of water and neutralized to pH 7.5 to 8.0 with 1000 parts of 50% caustic soda solution. The solution is dried in a spray drier, 2250 parts of a pale brown powder being obtained.

Analysis of the tannin gives the following values:

Tans _____ percent__ 66.8
Nontans _____ do____ 30.0
Tan/solids ratio _____ 69.1

Example 6

2000 parts of naphthalenesulfonic acid prepared as described in Example 4 is heated with 1000 parts of water to 140° C. in a lead-lined pressure vessel in which a pressure of 6 atmospheres is maintained by forcing in nitrogen. 235 parts of 98% acetaldehyde is pumped into the vessel in the course of three hours while stirring. When all of the acetaldehyde has been pumped in, the mixture is maintained at 140° C. for another three hours. The resultant solution is diluted with 2000 parts of water; it contains a condensation product of naphthalene-2-sulfonic acid and acetaldehyde in the molar ratio 1:0.67. It is neutralized with 1090 parts of 50% caustic soda solution to pH 7.2 to 7.8 and filtered. By evaporation in a drying pan at reduced pressure, 1700 parts of a pale brown powder is obtained.

Analysis of the tannin gives the following values:

Tans _____ percent__ 42.8
Nontans _____ do____ 52.4
Tan/solids ratio _____ 45.0

Example 7

2000 parts of naphthalenesulfonic acid obtained as described in Example 1 is heated with 900 parts of water to 160° C. in a lead-lined pressure vessel, nitrogen being forced in to maintain the pressure at 15 atmospheres. 385 parts of isobutylaldehyde is pumped in in the course of three hours while stirring and the mixture is then heated at 160° C. for another three hours. The solution obtained, which contains the condensation product of naphthalene-2-sulfonic acid and isobutyraldehyde in the molar ratio 1:0.68, is diluted with 2000 parts of water, neutralized with 1050 parts of 50% caustic soda solution to pH 7.2 to 8.0, filtered and dried in a double-drum drier, 1500 parts of a pale brown powder being obtained.

Analysis of the tannin gives the following values:

| | |
|---|---|
| Tans percent | 39.5 |
| Nontans do | 56.0 |
| Tan/solids ratio | 41.4 |

*Example 8*

1000 parts of naphthalene is heated together with 5000 parts of 98% sulfuric acid for ten hours at 160° to 165° C. The mixture of naphthalenedisulfonic acids (50% of naphthalene-2.7-disulfonic acid, 30% of naphthalene-2.6-disulfonic acid and 20% of naphthalene-1.6-disulfonic acid) formed is diluted with 2000 parts of water and 600 parts of aqueous 30% formaldehyde solution is added. The mixture is then heated in a lead-lined pressure vessel to 140° C. for thirty minutes, a pressure of about 5 atmospheres being set up. The solution, which contains the reaction product from 1 mole of naphthalenedisulfonic acids and 0.77 mole of formaldehyde, is cooled and diluted with 7000 parts of water, any excess sulfuric acid being removed by precipitation with 2500 parts of calcium hydroxide. The filtered solution is neutralized to pH value 7 to 8 with 1300 parts of 50% caustic soda solution and dried in a spray drier, 3000 parts of powder being obtained.

Analysis of the tannin gives the following values:

| | |
|---|---|
| Tans percent | 51.3 |
| Nontans do | 43.2 |
| Tan/solids ratio | 54.3 |

*Example 9*

1700 parts of naphthalene is introduced into 2450 parts of 98% sulfuric acid within five to ten minutes and the mixture is stirred for two hours at 80° C. The naphthalene-1-sulfonic acid formed is diluted with 1000 parts of water, 1070 parts of aqueous 30% formaldehyde solution is added and the mixture is then heated for thirty minutes at 140° C. in a lead-lined pressure vessel, in which a pressure of 8 atmospheres is produced by forcing in nitrogen. The reaction mixture is allowed to cool and diluted with a solution of 500 parts of caustic soda in 5000 parts of water, any excess sulfuric acid being removed by precipitation with 1000 parts of calcium hydroxide. The filtered solution is dried in a double-drum drier, 3700 parts of a powder being obtained. The essential constituent of the powder is the condensation product of naphthalene-1-sulfonic acid and formaldehyde combined in a molar ratio 1:0.74.

Analysis of the tannin gives the following values:

| | |
|---|---|
| Tans percent | 71.2 |
| Nontans do | 25.4 |
| Tan/solids ratio | 73.8 |

We claim:
1. In a process for the production of condensation products from naphthalenesulfonic acids having up to two sulfonic acid groups in the molecule and aliphatic aldehydes selected from the group consisting of formaldehyde, acetaldehyde, propionaldehyde and butyraldehyde by heating in an acid medium, the improvement which comprises reacting 1 mol of said naphthalenesulfonic acid with from 0.6 to 0.9 mol of said aldehyde at a temperature of between 120° and 170° C. at a hydrostatic pressure of between 3 and 15 atmospheres.

2. In a process for the production of condensation products from naphthalene-2-sulfonic acid and formaldehyde by heating in an acid medium, the improvement which comprises reacting continuously, in the absence of a gaseous phase, 1 mol of naphthalene-2-sulfonic acid with from 0.6 to 0.9 mol of formaldehyde at a temperature of between 120° and 170° C. and at a hydrostatic pressure of between 3 and 15 atmospheres.

3. In a process for the production of condensation products from naphthalenesulfonic acids having up to two sulfonic acid groups in the molecule and aliphatic aldehydes selected from the group consisting of formaldehyde, acetaldehyde, propionaldehyde and butyraldehyde by heating in an acid medium, the improvement which comprises reacting continuously 1 mol of said naphthalenesulfonic acid with from 0.6 to 0.9 mol of said aldehyde at a temperature of between 120° and 170° C. at a hydrostatic pressure of between 3 and 15 atmospheres.

References Cited by the Examiner

UNITED STATES PATENTS

| 1,191,480 | 7/16 | Schmidt | 260—505 |
| 1,696,199 | 12/28 | Gunther et al. | 260—505 |
| 3,067,243 | 12/62 | Richter et al. | 260—505 |

FOREIGN PATENTS

| 179,020 | 11/06 | Germany. |
| 16,245 | 3/08 | Great Britain. |

LORRAINE A. WEINBERGER, *Acting Primary Examiner.*

LEON ZITVER, *Examiner.*